Dec. 16, 1924.

C. Q. PAYNE 1,519,417

ELECTROMAGNETIC CLUTCH

Filed March 7, 1924      2 Sheets-Sheet 1

INVENTOR
Clarence Q. Payne

Dec. 16, 1924.
C. Q. PAYNE
1,519,417
ELECTROMAGNETIC CLUTCH
Filed March 7, 1924     2 Sheets-Sheet 2
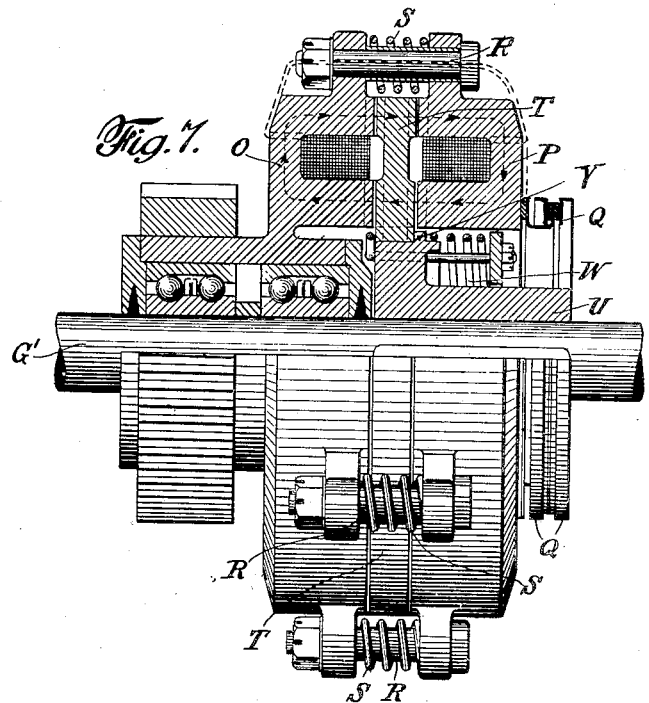
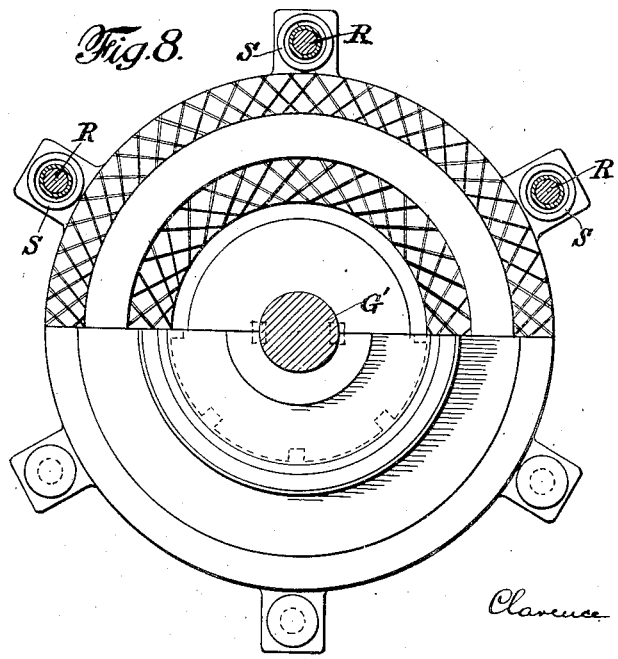
INVENTOR
Clarence Q. Payne Patented Dec. 16, 1924.

1,519,417

UNITED STATES PATENT OFFICE.

CLARENCE Q. PAYNE, OF NEW YORK, N. Y.

ELECTROMAGNETIC CLUTCH.

Application filed March 7, 1924. Serial No. 697,509.

*To all whom it may concern:*

Be it known that I, CLARENCE Q. PAYNE, a citizen of the United States, residing at New York, in the county of New York and State of New York, have invented new and useful Improvements in Electromagnetic Clutches, of which the following is a specification.

My invention relates to improvements in electro-magnetic clutches, and of similar electro-magnetic engaging devices such as magnetic brakes, chucks, etc., whereby their holding power and efficiency is increased.

It consists broadly of means for controlling and increasing the resistance to sliding of surfaces in contact such as those of clutch members, etc., which are held together by magnetic attraction.

It also consists of means for reducing the wear of magnetic clutch members which transmit power through their contact surfaces and which rub upon each other in starting and stopping.

It also consists of certain specific features embodying my invention whereby a very light clutch can be constructed having a powerful driving torque.

Figure 3:
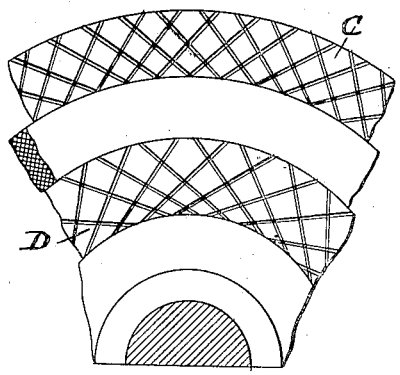
Figure 4:
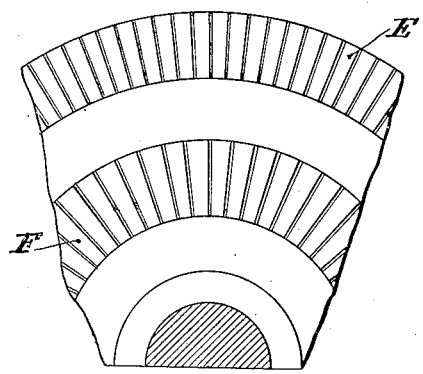
Figure 1:
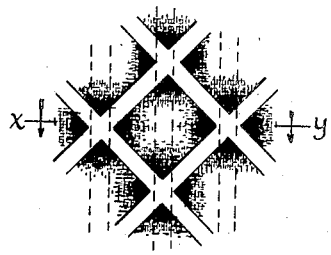
Figure 2:
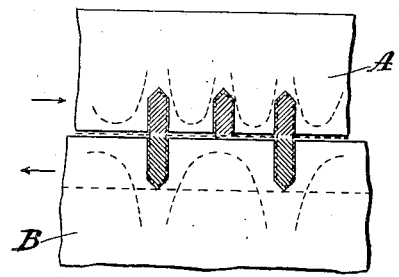
Figure 5:
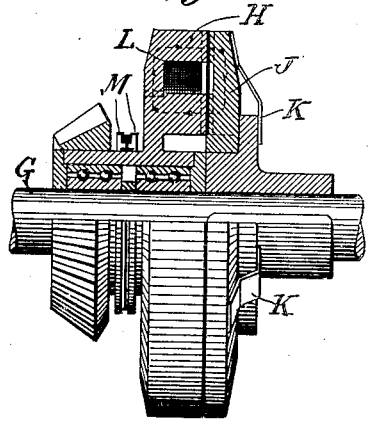
Figure 6:
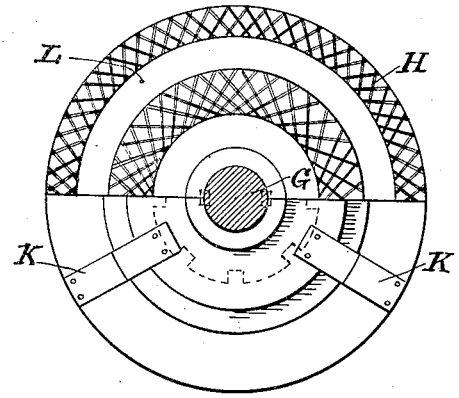

In the accompanying drawings, Figs. 1 and 2 illustrate diagrammatically in plan and sectional views means for producing local condensations of the lines of force by what may be called the "Isthmus method" along the magnetized surfaces held together in magnetic contact, or in extremely close proximity to each other through an intervening harder and less magnetic coating. Figs. 3 and 4 show sectional views of parts of clutch members whose surfaces are so modified or designed as to increase their resistance to sliding when brought into magnetic contact. Figs. 5 and 6 show in part sectional side and end views an application of my invention of a magnetic clutch having a single electro-magnet and an armature. Figs. 7 and 8 show in part sectional and end views an application of my invention to a magnetic clutch having an electromagnet arranged on each side of a disc wheel, and yoked together, whereby a very powerful torque is obtained by utilizing both sides of the disc wheel for driving engagement.

Magnetic clutches may be divided generally into two types or classes, namely, those which transmit the driving torque solely through field gaps, and those which transmit the torque by direct contact of magnetized surfaces, or of surfaces which receive their contact pressure from the attracting force of closely approached magnetized surfaces. In my pending application for U. S. patent, Serial Number 558,630, I have described and claimed certain improvements of an electro-magnetic clutch of the first type in which the driving torque is obtained entirely by flux distortion in a series of magnetic-field gaps, whereby it becomes possible to pick up the load to be transmitted quite gradually and to absorb or smooth out the shocks of a pulsating prime mover.

My present invention is concerned with the second type of magnetic clutch. Heretofore the objections to this type have been due partly to the rapid wear of the magnetized surfaces of the driving and driven members when they are brought into actual contact, and partly to the residual magnetism of the iron magnet-cores which interferes with or prevents prompt disengagement of the clutch members. The present invention not only overcomes these objections but it also greatly increases the resistance to sliding of the surfaces in contact so that with the same magneto-motive force a greatly increased driving torque can be obtained. In this way a much lighter clutch can be constructed for a given power transmission than has heretofore been possible.

The reluctance of an air-gap in a magnetic circuit, to the magneto-motive force of an electromagnet is far greater than that of its iron path. As the air-gap is reduced the tractive force between the approaching magnetized surfaces increases until it reaches a maximum upon actual contact. The lines of force are then afforded a practically unbroken iron path for their circuit and magnetic saturation with corresponding maximum tractive effort is then obtained by means of a comparatively small magneto-motive force owing to the much greater permeability of iron as compared with air. In other words, quite small field coils, iron cores and pole-pieces may be employed for a given tractive effort upon its armature as compared with those necessary when the same tractive effort must operate through an air-gap in the magnetic circuit. Since my present invention is concerned with securing the lightest possible electromagnetic clutch for a given power transmission I employ engaging members which are brought either into actual contact or so close thereto that the magnetic reluctance is not appreciably increased. Furthermore, I have found by trial that the distribution of the lines of force for magnetic contact surfaces can be controlled so as to greatly increase the resistance to sliding of the surfaces upon one another, with the same magneto-motive force. A very important reduction in the weight of the clutch can thus be obtained beyond that which has heretofore been possible.

When an electromagnet is energized by an electric current the pole-pieces, or polar faces, show an unequal distribution of the magnetic density over their surfaces. At moderate saturation there is a much greater accumulation of magnetic density, or "banking," at the edges than in the center. If the polar faces are square or rectangular in shape so as to present corners, these show an even greater magnetic density than at the edges, as they appear to permit "supersaturation" of the iron at and near the positions where points are formed by the converging edges. Fig. 1 illustrates the means employed in my invention to secure a vast number of local condensations or convergences of the lines of force along the polar faces of an electromagnet. These are preferably obtained by means of intersecting grooves, or grooved recesses, in the polar faces. At each intersection four corners are formed which present points or apexes, and about these points a great accumulation of magnetic density is formed as illustrated diagrammatically by means of shading in Fig. 1. Fig. 2 shows in vertical cross sections along the line X Y of Fig. 1, the contact surfaces of a pole-piece and its armature. Intersecting grooves are shown in the pole-piece B while the armature A is provided with parallel grooves preferably spaced at distances equal to the intersections of the grooves apart in the pole-piece, so as to register with them when superposed as indicated by broken lines in Fig. 1. When the armature A tends to move relatively to the pole-piece B of the electromagnet by sliding along the plane of contact such motion is strongly resisted not only by local differences of magnetic density on the opposite sides of the plane of contact, but also by local differences of magnetic density in a direction at right angles thereto, namely, parallel with the plane of contact. The former will be obvious from the drawing while the latter will be clear from the consideration that in moving the armature A, its edges, being superposed over the grooved intersections of B tend to move from positions of greater magnetic density to positions of less density. The point convergence of the lines of force caused by intersecting grooves on one side of the plane of contact when opposed by edge convergences of the lines of force caused by radial grooves on the other side thereof produce very intense local magnetic condensations by the "Isthmus method," as illustrated by the Faraday electromagnet. The removal of metal to form the grooves and the disposal of the resulting points and edges in relation to one another by my invention cause these innumerable local condensations to co-act and thus to greatly increase the resistance to sliding of the engaging members in a direction parallel with their plane of contact. This constitutes a new application of the "Isthmus method" of the arrangement of the lines of force for a useful purpose.

Figs. 3 and 4 illustrate the application of my invention to an electromagnetic clutch by enlarged sectional views of portions of the annular faces of the magnet-poles of an electromagnet and of the contact surfaces of its armature. The former, C and D are provided with diagonally intersecting grooves along their polar faces while the latter E and F have radial grooves preferably so spaced as to register with the intersections of the grooves on the magnet-poles to accomplish the purpose already explained above.

By thus controlling the distribution of the lines of force so as to secure a large number of local condensations or convergences of the flux density along the contact surface of the clutch members, I have found that with the same magnetizing force it is possible to increase the resistance to sliding of the clutch members upon each other 50 to 75% over that which is possible or obtainable with smooth or non-grooved contact surfaces. It is possible to vary the size, shape and position of the grooves upon the contact surfaces within wide limits and to secure in all cases some increase in the sliding resistance thereby. For example, both the magnet-pole faces as well as the armature faces may be provided with radial grooves, or intersecting grooves may be placed upon the armature faces and radial grooves upon the magnet faces, etc. My tests, however, have clearly shown that with a single electro-magnet the greatest resistance to sliding is obtained when numerous strong condensations of the lines of force, or point convergences thereof are localized along the polar faces of the electromagnet, and are swept over by edge convergences of the lines of force localized on the armature faces so as to create by the "Isthmus method," when in contact, wide differences of magnetic density in two directions, namely at right angles to, and also parallel with, their contact surfaces as already explained above.

The application of my invention to a complete electromagnetic clutch is illustrated in Figs. 5 and 6. This clutch is utilized to make a bevel gear fast and loose on the shaft G. It can of course be utilized for a shaft coupling as well. An annular electromagnet H is here shown with an armature J, each mounted on separate hubs and so placed with reference to each other that they form parts of the same magnetic circuit. The hub of the armature J is keyed to the shaft G and forms the driving member, while the hub of the electromagnet H revolves freely on the shaft and forms the driven member of the clutch. The armature J is held by means of the springs K K in contact with the flanged shoulder of the hub and out of engagement with the electromagnet when the latter is not charged. It slides upon a series of keys in the hub flange by means of keyways placed along its inner circumference when it is moved against the pressure of the springs K K a short distance to make contact engagement with the polar faces of the electromagnet. The field-coil L is energized by means of an electric current conveyed to it by means of the insulated conductor rings M, and contact brushes from an outside source of electric power. Thus energized, a large amount of power can be transmitted to the bevel gear through the contact faces owing to the high co-efficient of friction of their surfaces by reason of the numerous local condensations of the lines of force formed by the intersecting and radial grooves upon the polar faces of the electromagnet and the armature faces respectively as shown in Fig. 6 as well as in Figs. 3 and 4.

In Figs. 7 and 8, in sectional side and end-views, is shown a further application of my invention to a clutch which is capable of transmitting a still greater amount of power with a minimum weight. This clutch is also illustrated in its application to a gear coupling. Here two annular electromagnets O, P, are shown, one of which is mounted on a hub which revolves freely upon the shaft G' while the other one is held to the former by means of a series of circumferential bolts R, R, which may be of non-magnetic material and provided with sleeves upon which it can move a short distance against the pressure of the springs S, S, when the electromagnets are energized. Located centrally between the electromagnets is a light disc wheel T, whose upper and lower portions form parts of the same magnetic circuit with the two electromagnets O, and P, when they are energized, as shown by the broken line and arrows in Fig. 7. The polar faces of the electromagnets are preferably provided with intersecting grooves as shown in the upper half of Fig. 8, while the contact surfaces of the disc wheel are preferably provided with radial grooves on both sides. The disc wheel T is free to slide a short distance by means of keyways upon keys located upon the circumference of the flange of the hub U. It is held in contact with the shoulder V of the hub U by means of the spring W so as to revolve freely out of contact with the polar faces of the electromagnets in order to avoid rubbing and grinding of the surfaces when the eletromagnets are not energized. Electric current to energize the electromagnets is conveyed to them by means of insulating collector rings shown at Q, Q, from contact brushes connected with an outside source of electric power.

When so energized the grooved polar faces of the electro-magnets O and P and those of the armature disc wheel T are brough into contact against the spring pressure of the springs S S and W and a very large amount of power can then be transmitted to the spur wheel owing to the high co-efficient of friction of the contact surfaces by reason of the numerous local point and edge convergences of the magnetic lines of force formed thereon by the intersecting grooves in accordance with the "Isthmus method" as explained above.

An electromagnetic clutch capable of transmitting a very large amount of power can thus be constructed which is comparatively light and which occupies only a small amount of space. It will also be clear that two or more disc wheels can be introduced between the polar faces of the electro-magnets O and P and by so connecting one set slidably at their outer circumferences with the electro-magnets, with spring release, and the other set likewise by their inner circumferences with the hub of the driving or driven member, the power transmitted can thus be still more increased by the correspondingly increased surfaces of contact.

It will be apparent also that by suitable arrangement of intersecting grooves on both sides of the surfaces of contact similar opposing point and edge relations of the magnetic lines of force by the "Isthmus method" shown in Figs. 1 and 2 may be reciprocally established on both sides of said contact surfaces.

In order to secure a high magnetic permeability for the lines of force in the magnetic circuit of the electromagnet of my clutch, it is very desirable to use quite soft iron for the electromagnet as well as for the armature. Soft iron, i. e., iron low in carbon content loses its residual magnetism much more promptly when the electric current of the magnet coils is interrupted than in the case of iron having a high carbon content. Soft iron having a high magnetic permeability, is physically softer than iron having an appreciable amount of carbon. It is therefore less resistant to wear than the latter which is also capable of being case-hardened to increase its surface resistance to wear.

By my invention I am able to make use of very soft iron for the electromagnet and armature of my clutch by applying a very thin coating of a much harder and less magnetic metal, such as manganese, chromium, etc., to the surfaces of the electromagnet and armature which are brought into contact and which rub upon each other when the clutch is thrown in and out of engagement. Such a coating is preferably applied by means of electro-plating so as to regulate its thickness. This should usually not exceed .002″ or .003″ for clutches of moderate power transmission. I have found that a smooth and closely adherent coating of chromium of such a thickness is so extremely hard that it can scarcely be scratched with a hacksaw. The actual separation of the iron surfaces of the electromagnet and of the armature even by so small an amount as .002″ or .003″ greatly assists to overcome the residual magnetism and to secure their prompt release from engagement when the current is interrupted. At the same time the increased separation of the iron surfaces by reason of the less magnetic coating does not appreciably increase the reluctance of the magnetic circuit, nor appreciably reduce the tractive force of the electromagnet upon the armature.

In order to further protect the coated or electro-plated surfaces from wear, I fill the grooved recesses of the contact surfaces of the electromagnet and armature with a soft lubricant such as graphite, or a similar soft lubricating material, so that an infinitesimal film thereof may be constantly superposed over the harder wear-resisting coating of chromium, etc., covering the iron contact surfaces of the clutch members.

The desired thickness of the wear resisting coating of metal applied to the contact surfaces of the clutch members cannot be shown to scale in the accompanying drawings. The separation of the driving surfaces is therefore shown on an exaggerated scale in Fig. 2 and the electro-plated wear resisting metal which covers the surfaces, thus maintained slightly out of contact, is indicated by broken lines between them.

The curved dotted lines indicate diagrammatically the "banking" of the flux density at the corners and edges of the grooves in the contact surfaces, while the shading within the grooves represents the lubricating material contained therein for the purpose explained above.

Having thus described my invention, I claim:

1. In an electro-magnetic engaging device, a driving and a driven member forming parts of the same magnetic circuit, one of said members having a contact surface provided with intersecting grooves along the plane of contact of said member.

2. In an electro-magnetic engaging device, a driving and a driven member which form parts of the same magnetic circuit and means for producing numerous local point convergences of the lines of force in said magnetic circuit on one side of the plane of contact of said members, and edge convergences of said lines of force on the other side thereof opposing said point convergences.

3. In an electro-magnetic engaging device, a driving and a driven member forming parts of the same magnetic circuit whose contact surfaces are provided with grooves disposed with relation to each other to resist sliding along the plane of contact by the "Isthmus method" of arrangement of the lines of force thereon.

4. In an electro-magnetic clutch, a driving and a driven member which form parts of the same magnetic circuit and whose contact surfaces are provided with intersecting grooves therefor on one side of their plane of contact and with grooves on the other side of said plane of contact which oppose and register with the intersections of the former.

5. In an electromagnetic clutch, a driving and a driven member comprising an armature and an electromagnet forming parts of the same magnetic circuit, the polar faces of said electromagnet being provided with intersecting grooves and the contact surfaces of said armature being provided with radial grooves.

6. In an electromagnetic clutch a driving and a driven member comprising an armature and an electromagnet forming parts of the same magnetic circuit, the polar faces of said electromagnet being provided with intersecting grooves and the contact surfaces of said armature being provided with radial grooves so spaced as to register with the intersections of the grooves on the polar faces.

7. In an electro-magnetic clutch, a driving and a driven member which form parts of the same magnetic circuit, the contact surface of one of said members being provided with grooves adjacent the plane of contact, and means for lubricating said surfaces comprising a material of greater softness than that of said members and contained in said grooves.

8. In an electromagnetic clutch, a driving and a driven member which form parts of the same magnetic circuit, whose contact surfaces are provided with grooves on one or both sides of the plane of contact, in combination with means for resisting wear of said surfaces comprising a metal coating of greater hardness than that of said members, and means for lubricating said surfaces comprising a material of greater softness than that of said members and contained in said grooves.

9. In an electromagnetic clutch, a driving member and a driven member, which form parts of the same magnetic circuit, whose contact surfaces are chrome plated and are provided with grooves filled with graphite lubricating material, on one or both sides of the plane of contact of said members.

10. In an electromagnetic clutch, a driving and a driven member comprising an armature and an electromagnet forming parts of the same magnetic circuit, the contact faces of said electromagnet and armature being chrome plated, said electromagnet-polar faces being provided with intersecting grooves, and said armature faces being provided with radial grooves,—both series of grooves being filled with graphite lubricating material.

11. In an electro-magnetic clutch, a driving and a driven member forming parts of the same magnetic circuit and comprising two electro-magnets yoked together and an armature disc placed centrally between said electro-magnets, and means for producing local point convergences of the lines of force in said magnetic circuit, said means comprising intersecting grooves on the sides of the planes of contact of said members.

12. In an electro-magnetic clutch a driven and a driving member comprising two electro-magnets yoked together and an armature disc placed centrally between said electro-magnets in combination with means for producing point convergences of the lines of force on one side and edge convergences of said line of force opposite said point convergences on the other side of the respective planes of contact of said members.

13. In an electro-magnetic clutch a driving and a driven member comprising two electro-magnets yoked together and an armature disc placed centrally between said electro-magnets, certain of the contact surfaces of said members being provided with intersecting grooves at the sides of the planes of contact of said members and means for lubricating said surfaces, said lubricating means comprising a material of greater softness than that of said members and contained in said grooves.

14. In an electromagnetic clutch a driven member and a driving member which form parts of the same magnetic circuit comprising two electromagnets yoked together and an armature placed centrally between said electromagnets, the polar-faces of said electromagnets being provided with intersecting grooves, and the contact faces of said armature being provided with radial grooves.

15. In an electromagnetic clutch a driven member and a driving member which form parts of the same magnetic circuit, comprising two electromagnets yoked together and a disc-armature placed centrally between said electromagnets, whose contact surfaces are provided with grooved recesses, in combination with means for resisting wear of said surfaces comprising a metal coating of greater hardness and less magnetic than that of said members, and means for lubricating said surfaces comprising a material of greater softness than that of said members and contained in said grooved recesses.

16. In an electromagnetic clutch a driven and a driving member, which form parts of the same magnetic circuit, comprising two electromagnets yoked together and a disc-armature placed centrally between said electromagnets, the contact faces of said electromagnets and armature being chrome plated, said electromagnet-polar faces being provided with intersecting grooves and said armature faces being provided with radial grooves, both series of said grooved recesses being filled with graphite lubricating material.

In testimony whereof, I have signed my name to this specification.

CLARENCE Q. PAYNE.